(12) United States Patent
Stehle et al.

(10) Patent No.: US 9,651,410 B2
(45) Date of Patent: May 16, 2017

(54) PADDLE STYLE ORIFICE PLATE WITH INTEGRAL PRESSURE PORTS

(71) Applicant: Dieterich Standard, Inc., Boulder, CO (US)

(72) Inventors: John Henry Stehle, Boulder, CO (US); Paul Timothy Deegan, Boulder, CO (US); Stephen Arthur Ifft, Boulder, CO (US)

(73) Assignee: Dieterich Standard, Inc., Boulder, CO (US)

( * ) Notice: Subject to any disclaimer, the term of this patent is extended or adjusted under 35 U.S.C. 154(b) by 92 days.

(21) Appl. No.: 14/674,434

(22) Filed: Mar. 31, 2015

(65) Prior Publication Data

US 2016/0290840 A1 Oct. 6, 2016

(51) Int. Cl.
*G01F 1/42* (2006.01)
*G01F 1/40* (2006.01)

(52) U.S. Cl.
CPC . *G01F 1/42* (2013.01); *G01F 1/40* (2013.01)

(58) Field of Classification Search
CPC ........................................................ G01F 1/42
USPC ............................ 73/861.61, 861.62, 861.52
See application file for complete search history.

(56) References Cited

U.S. PATENT DOCUMENTS

| | | |
|---|---|---|
| 1,480,661 A | 1/1924 | Brown |
| 1,559,547 A | 11/1925 | Brown |
| 2,614,423 A | 10/1952 | Carbone |
| 2,803,962 A | 8/1957 | George |
| 2,842,962 A | 7/1958 | Horace |
| 2,856,962 A | 10/1958 | Christoph |
| 2,927,462 A | 6/1960 | Li |

(Continued)

FOREIGN PATENT DOCUMENTS

| | | |
|---|---|---|
| GB | 2 301 676 | 11/1995 |
| JP | 6-213694 | 8/1994 |

(Continued)

OTHER PUBLICATIONS

Notification to Make Rectification for Chinese Patent Application No. 201520663467.4, dated Nov. 5, 2015, 2 pages.

(Continued)

*Primary Examiner* — Jewel V Thompson
(74) *Attorney, Agent, or Firm* — Westman, Champlin & Koehler, P.A.

(57) ABSTRACT

A differential pressure fluid flow meter element for insertion between the connecting flanges of conduit sections of a fluid carrying conduit includes a flat orifice plate having a fluid contacting region for positioning in a flow of fluid through the conduit and a handle extending outward from an outer portion of the fluid contacting region. The flat orifice plate includes at least one pressure port formed in the fluid contacting region of the plate, and at least one impulse line channel formed in the flat orifice plate and extending from one of the at least one pressure port through the handle to a corresponding transmitter interface port. A plurality of apertures formed in the handle and disposed and arranged relative to the at least one transmitter interface port allow mounting of the process variable transmitter directly to the paddle style orifice plate handle, with the transmitter substantially perpendicular to a plane of the handle.

21 Claims, 10 Drawing Sheets

(56) References Cited

U.S. PATENT DOCUMENTS

| | | | |
|---|---|---|---|
| 3,590,637 A | 7/1971 | Brown | |
| 3,759,098 A | 9/1973 | Logsdon et al. | |
| 3,998,097 A * | 12/1976 | Akashi | G01F 1/42 73/861.61 |
| 4,249,164 A | 2/1981 | Tivy | |
| 4,290,314 A | 9/1981 | Geronime | |
| 4,370,893 A | 2/1983 | Combes | |
| 4,399,708 A | 8/1983 | Van Scoy | |
| 4,476,730 A | 10/1984 | Brumm | |
| 4,750,370 A * | 6/1988 | Ossyra | G01F 1/42 73/861.61 |
| 4,938,077 A | 7/1990 | Robinet | |
| 5,086,655 A * | 2/1992 | Fredericks | G01F 1/42 73/861.52 |
| 5,297,426 A * | 3/1994 | Kane | G01F 5/00 73/202 |
| 5,461,932 A * | 10/1995 | Hall | G01F 1/42 138/40 |
| 5,529,093 A * | 6/1996 | Gallagher | F15D 1/025 138/40 |
| 6,311,568 B1 | 11/2001 | Kleven | |
| 6,321,166 B1 | 11/2001 | Evans et al. | |
| 6,345,536 B1 * | 2/2002 | Morrison | G01F 1/50 73/861.04 |
| 6,543,297 B1 | 4/2003 | Kleven | |
| 6,622,573 B2 | 9/2003 | Kleven | |
| 6,871,881 B1 | 3/2005 | Hutton | |
| 7,255,012 B2 | 8/2007 | Hedtke | |
| 7,284,450 B2 | 10/2007 | Orleskie et al. | |
| 7,591,192 B2 * | 9/2009 | Williams | F16L 23/006 137/597 |
| 7,654,154 B2 * | 2/2010 | Garnett | G01F 1/42 73/861.52 |
| 9,062,994 B2 * | 6/2015 | Ifft | G01F 1/42 |
| 2003/0188586 A1 * | 10/2003 | Orleskie | G01F 1/34 73/861.61 |
| 2008/0307896 A1 | 12/2008 | Ifft et al. | |
| 2009/0199656 A1 * | 8/2009 | Kumar | F16L 55/02718 73/861.61 |
| 2014/0260670 A1 | 9/2014 | Strom et al. | |
| 2015/0083262 A1 | 3/2015 | Van Buskirk | |

FOREIGN PATENT DOCUMENTS

| | | |
|---|---|---|
| WO | 01/20267 A1 | 3/2001 |
| WO | 01/20282 A1 | 3/2001 |

OTHER PUBLICATIONS

Final Office Action from U.S. Appl. No. 11/764,030, dated Dec. 16, 2014.
Office Action from U.S. Appl. No. 11/764,030, dated Aug. 26, 2014.
Final Office Action from U.S. Appl. No. 11/764,030, dated Jan. 30, 2009.
Office Action from U.S. Appl. No. 11/764,030, dated Jun. 20, 2008.
Search Report and Written Opinion in International application No. PCT/US2016/021663 dated Jul. 14, 2016.
Folsom R G et al: "Review of the Pitot Tube", Transaction of the American Society of Mechanical Engineers, vol. 17, No. 78, Oct. 17, 1956, pp. 1447-1460, XP002074738, ISSN: 0097-6822 figure 1 Introduction; p. 1447.

\* cited by examiner

PADDLE STYLE ORIFICE PLATE WITH INTEGRAL PRESSURE PORTS

BACKGROUND

The present disclosure relates to industrial process control or monitoring systems. More specifically, the present disclosure relates to paddle style orifice plates and process variable transmitters of the type which use paddle style orifice plates to measure a process variable of an industrial process.

In industrial settings, control systems are used to monitor and control inventories of industrial and chemical processes, and the like. Typically, the control system that performs these functions uses field devices distributed at key locations in the industrial process and coupled to control circuitry in the control room by a process control loop. The term "field device" refers to any device that performs a function in a distributed control or process monitoring system, including all devices used in the measurement, control and monitoring of industrial processes.

Some field devices include a transducer which couples to the process fluid. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, actuators, solenoids, indicator lights, and others.

Field devices, such as process variable sensors used in industrial processes can be installed in the field on pipelines, tanks and other industrial process equipment. Such devices sense process variables such as process fluid flow, process fluid temperature, process fluid pressure, process fluid conductivity, process fluid pH and other process variables. Other types of industrial process field devices include valves, actuators, field controllers, data displays and communication equipment such as industrial field network bridges.

One type of process variable sensor is a flow meter that can measure a rate of fluid flow, for example. Measuring flow in a pipe is a standard metric many industries need. The use of paddle style orifice plates to measure differential pressure flow is one of the most popular methods in use today. One drawback for using a paddle style orifice plate is that it is only one of several components necessary to make a measurement in a pipeline. Normally, an orifice plate is installed to create a restriction in the flow. Pressure measurements are taken just upstream and downstream of the plate using pressure ports. Typically, the pressure ports are located in special connection flanges welded into the pipeline. From these flanges the separate pressures are connected to a manifold that is attached to a differential pressure transmitter. The plate, flange tap flanges, valves, impulse tubes, instrument manifolds, and a transmitter are all separate components that must be procured and connected to make the measurement.

An alternative to the use of paddle style orifice plates is wafer style integrated flow meters which can be bolted into a pipe and connected to a data control system to get a flow measurement. However, even with the evolution of orifice plates into wafer style integrated flow meters, some users of industrial process control or monitoring systems are reticent about changing their standard practices to incorporate the newer technology associated with the wafer style integrated flow meters. In spite of combining numerous components into an integrated flow meter, some of these users do not like the additional width that comes with a wafer-type meter. The exposed bolts that span the wafer between the process flanges can be perceived as a safety risk if the fluid in the pipe is hazardous. However the narrower width of a paddle style orifice plate, typically in the range of 0.125-0.25", does not carry the same exposed bolt perception.

Testing and other complications can limit wafer style integrated flow meters in size and materials. Expensive testing is frequently required to make a new line size and new calibration values. One reason for this can be due to the flow lab testing time required to create a formula correcting the plate's performance in different pipe schedules. Materials can be difficult to source for various tubing sizes and expensive to weld test. These and other reasons can make the use of paddle style orifice plate flow meters more desirable in certain circumstances or by some users, yet the above-discussed disadvantages of paddle style orifice plates remain.

The discussion above is merely provided for general background information and is not intended to be used as an aid in determining the scope of the claimed subject matter.

SUMMARY

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

A differential pressure fluid flow meter element for insertion between the connecting flanges of conduit sections of a fluid carrying conduit includes a flat orifice plate having a fluid contacting region for positioning in a flow of fluid through the conduit and a handle extending outward from an outer portion of the fluid contacting region. The flat orifice plate includes at least one pressure port formed in the fluid contacting region of the plate, and at least one impulse line channel formed in the flat orifice plate and extending from one of the at least one pressure port through the handle to a corresponding transmitter interface port. A plurality of apertures formed in the handle and disposed and arranged relative to the at least one transmitter interface port allow mounting of the process variable transmitter directly to the paddle style orifice plate handle, with the transmitter substantially perpendicular to a plane of the handle.

It must be noted that any of the disclosed features, components, apparatus, systems and method steps can be used in any combination with other disclosed features, components, apparatus, systems and method steps. The present disclosure includes such alternate combinations even though the disclosed features, components, apparatus, systems and method steps are not illustrated or discussed in combination in the example embodiments provided.

DETAILED DESCRIPTION OF ILLUSTRATIVE EMBODIMENTS

Disclosed embodiments provide a paddle style orifice plate design with embedded impulse lines which allow a process variable transmitter to be mounted on the handle of the orifice plate. This configuration allows omission of other components or fabrication/installation steps commonly required with paddle style orifice plates, such as tapped flanges, separate impulse lines, and an instrument manifold.

Figure 1:
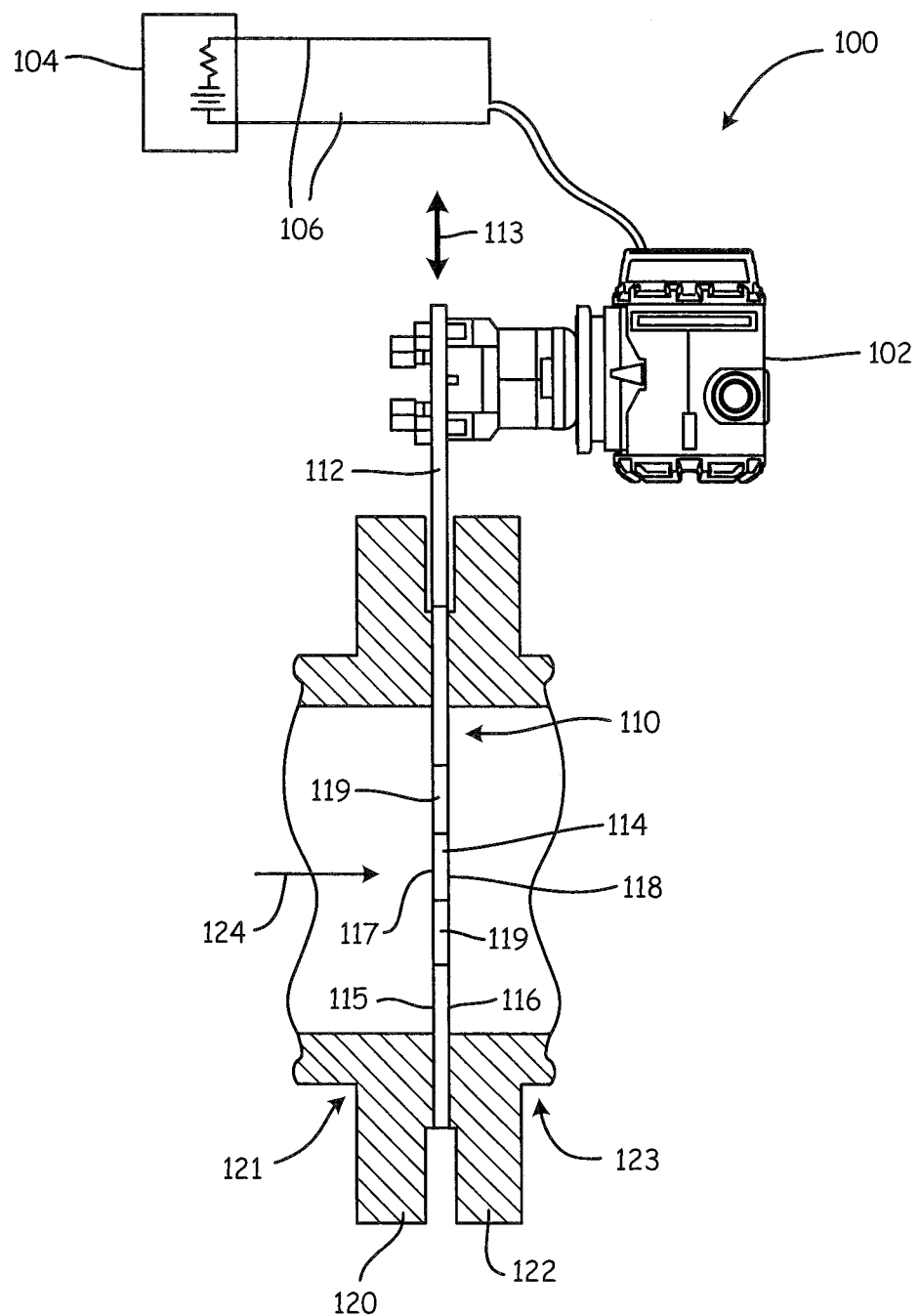
FIG. 1 is a diagrammatic illustration of an industrial process control or monitoring system for use in monitoring or controlling a process fluid in accordance with an example embodiment.

FIG. 1 is a simplified diagram showing an industrial process control or monitoring system 100 for use in monitoring or controlling a process fluid in an industrial process. Typically, a field device such as a process variable transmitter 102 is located at a remote location in a facility, and transmits a sensed process variable back to a centrally-located control room 104. Various techniques can be used for transmitting the process variable, including both wired and wireless communications. One common wired communication technique uses what is known as a two-wire process control loop 106 in which a single pair of wires is used to both carry information as well as provide power to the transmitter 102. One technique for transmitting information is by controlling the current level through the process control loop 106 between 4 mA and 20 mA. The value of the current within the 4-20 mA range can be mapped to corresponding values of the process variable. Example digital communication protocols include HART® (a hybrid physical layer consisting of digital communication signals superimposed on a standard 4-20 mA analog signal), FOUNDATION™ Fieldbus (an all-digital communication protocol promulgated by the Instrument Society of America in 1992), Profibus communication protocol, or others. Wireless process control loop protocols, such as radio-frequency communication techniques including WirelessHART® (IEC 62591), may also be implemented. Process control loop 106 in FIG. 1 represents either or both of wired and wireless embodiments of communication connections between transmitter 102 and control room 104.

Process variable transmitter 102 is mounted to a handle portion 112 of a paddle style flat orifice plate 110 such that the process variable transmitter is substantially perpendicular to a plane of the handle and of the flat orifice plate 110. The plane is represented in FIG. 1 by line 113. Paddle style flat orifice plate 110 is a differential pressure fluid flow meter element which is coupled between flanges 120 and 122 of fluid carrying conduit sections 121 and 123, and which has a fluid contacting or center region 114 positioned in the flow of process fluid providing upstream and downstream facing surfaces 115 and 116 which are oriented perpendicular to a direction of fluid flow in the conduit sections as represented by arrow 124. The upstream and downstream facing surfaces 115 and 116 each respectively have fluid engaging portions 117, 118 disposed within the conduit. Apertures 119 are formed between the fluid engaging portions 117 and 118 in the center region of the orifice plate and permit fluid carried through the conduit to flow through the orifice plate. Other portions of the upstream and downstream facing surfaces can be positioned between flanges 120 and 122. Process variable transmitter 102 is configured to measure one or several process fluid variables in the process piping. Example process variables include flow, temperature, pressure, and differential pressure (DP). Process variable transmitter 102 includes a sensor 224 and other components/circuitry (shown in FIG. 2) that are configured to receive a process variable or variables and provide a transmitter output on process control loop 106.

Figure 2:
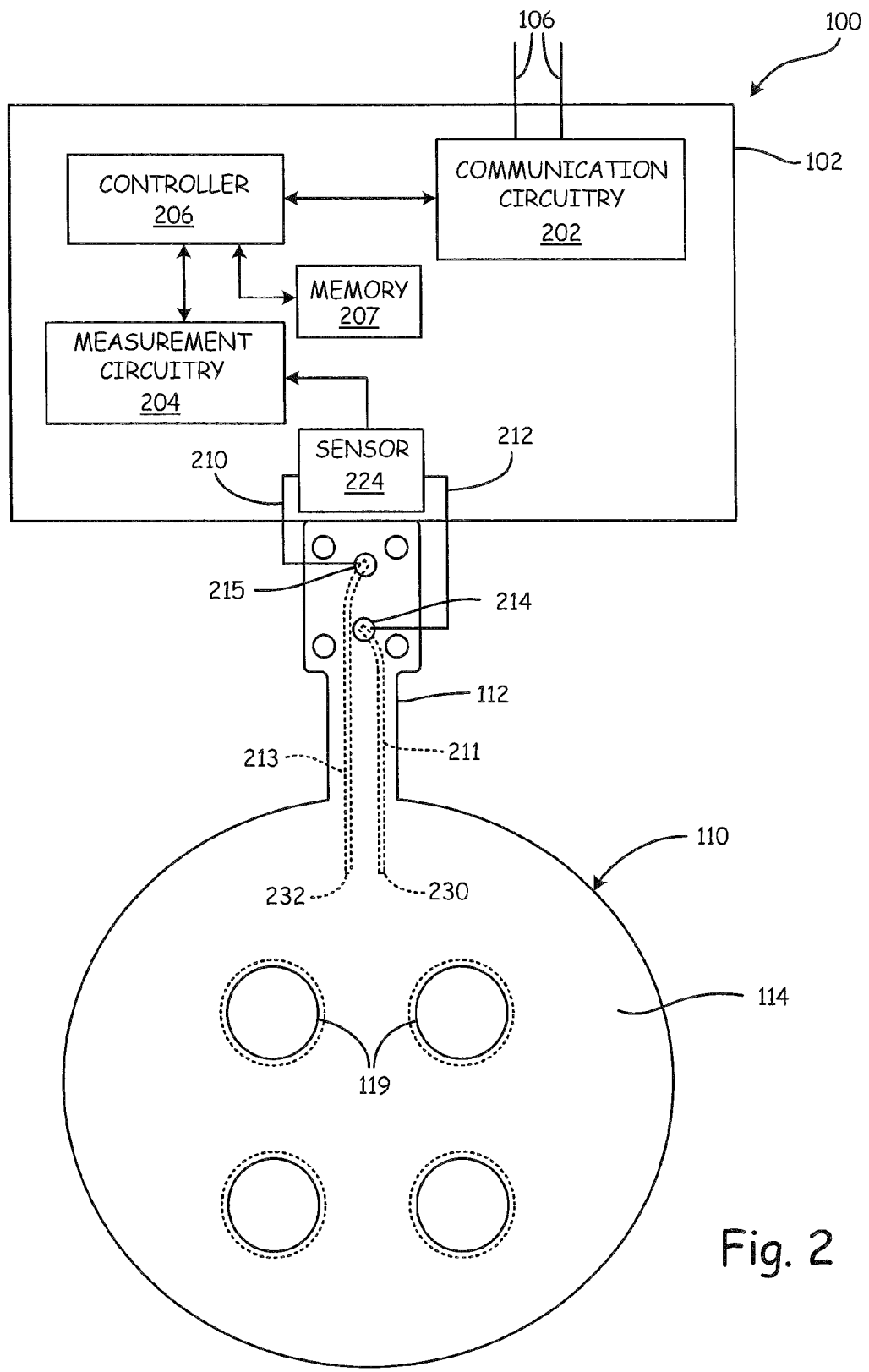
FIG. 2 is a illustration, with a portion shown in block diagram, of the system and transmitter shown in FIG. 1 in accordance with an example embodiment.

Referring now also to FIG. 2, in exemplary embodiments, process variable transmitter 102 is a differential pressure or multivariable transmitter. Sensor 224 of transmitter 102 is a pressure sensor that is fluidically coupled to pressure ports 230 and 232 on the upstream and downstream facing surfaces 115 and 116 of orifice plate 110 through transmitter interface ports 214 and 215 on the handle 112 of the orifice plate, and through impulse line channels 211 and 213 formed in the orifice plate and extending through handle 112.

FIG. 2 illustrates components of an exemplary embodiment of process variable transmitter 102. As shown in the system block diagram of FIG. 2, process variable transmitter 102 includes a sensor 224 and other components/circuitry (not shown in FIG. 1) that are configured to receive a process variable and provide a transmitter output on process control loop 106. As discussed, in exemplary embodiments, process variable transmitter 102 is a differential pressure or multivariable transmitter.

As in FIG. 1, system 100 shown in FIG. 2 is coupleable to a process control loop such as loop 106 and is adapted to communicate a process variable output, for example related to a differential pressure of fluid flow within the process pipe or conduit. In other embodiments the process variable output is related to multiple variables such as pressure and temperature. Transmitter 102 of system 100 includes loop communication circuitry 202, pressure sensor 224, measurement circuitry 204, and controller 206.

Loop communication circuitry 202 is coupleable to the process control loop 106 and is adapted to communicate upon the process control loop. Loop communication circuitry 202 can include circuitry for communicating over a wired communication link and/or a wireless communication link. Such communication can be in accordance with any appropriate process industry standard protocol such as the protocols discussed above, including both wired and wireless protocols.

As mentioned, in some exemplary embodiments, pressure sensor 224 includes first and second ports 210, 212 which are coupled to pressure ports 230 and 232 on the upstream and downstream facing surfaces 115 and 116 of orifice plate 110 through transmitter interface ports 214 and 215 on the handle 112 of the orifice plate, and through impulse line channels 211 and 213 formed in the orifice plate and extending through handle 112. Coupling of pressure sensor 224 through ports 214 and 215 includes coupling through isolation diaphragms and other pressure conveying apparatus and configurations. Sensor 224 can be any device that has an electrical characteristic that changes in response to changes in applied pressure. For example, sensor 224 can be a capacitive pressure sensor the capacitance of which changes in response to the differential pressure applied between ports 210 and 212.

Measurement circuitry 204 is coupled to sensor 224 and is configured to provide a sensor output related at least to differential pressure between ports 210 and 212. Measurement circuitry 204 can be any electronic circuitry that can provide a suitable signal related to differential pressure. For example, measurement circuitry can be an analog-to-digital converter, a capacitance-to-digital converter or any other appropriate circuitry.

Controller 206 is coupled to measurement circuitry 204 and loop communication circuitry 202. Controller 206 is adapted to provide a process variable output to loop communication circuitry 202, which output is related to the sensor output provided by measurement circuitry 204. Controller 206 can be a programmable gate array device, a microprocessor, or any other appropriate device or devices. Although loop communication circuitry 202, measurement circuitry 204 and controller 206 have been described with respect to individual modules, it is contemplated that they can be combined such as on an Application Specific Integrated Circuit (ASIC). In an exemplary embodiment, memory 207 is included and is coupled to controller 206 for storage of computer readable instructions, parameter values, etc. used to configure controller 206 and/or measurement circuitry 204.

Figure 3:
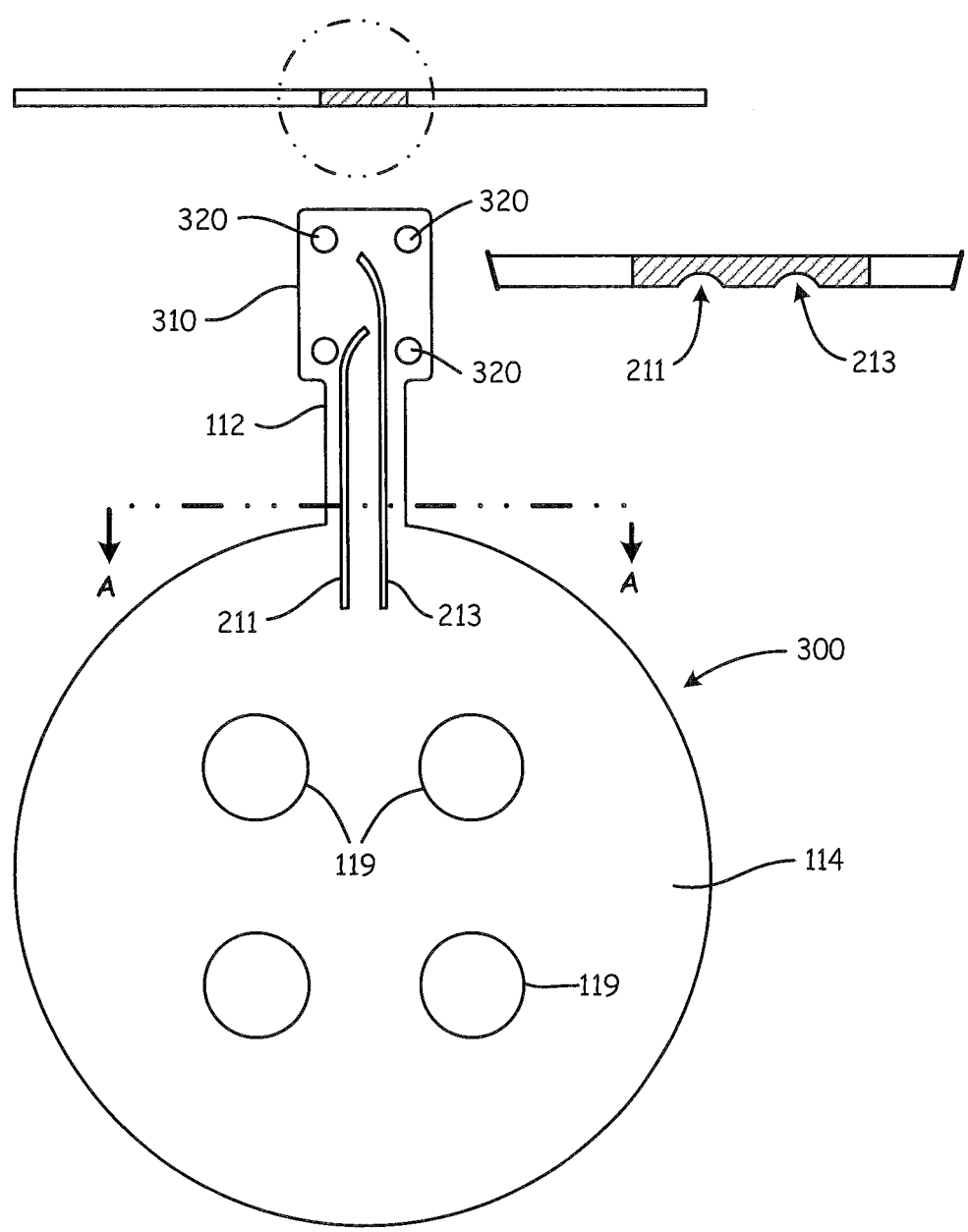
FIG. 3 is a front view of a paddle style orifice plate section in accordance with disclosed embodiments.
Figure 4:
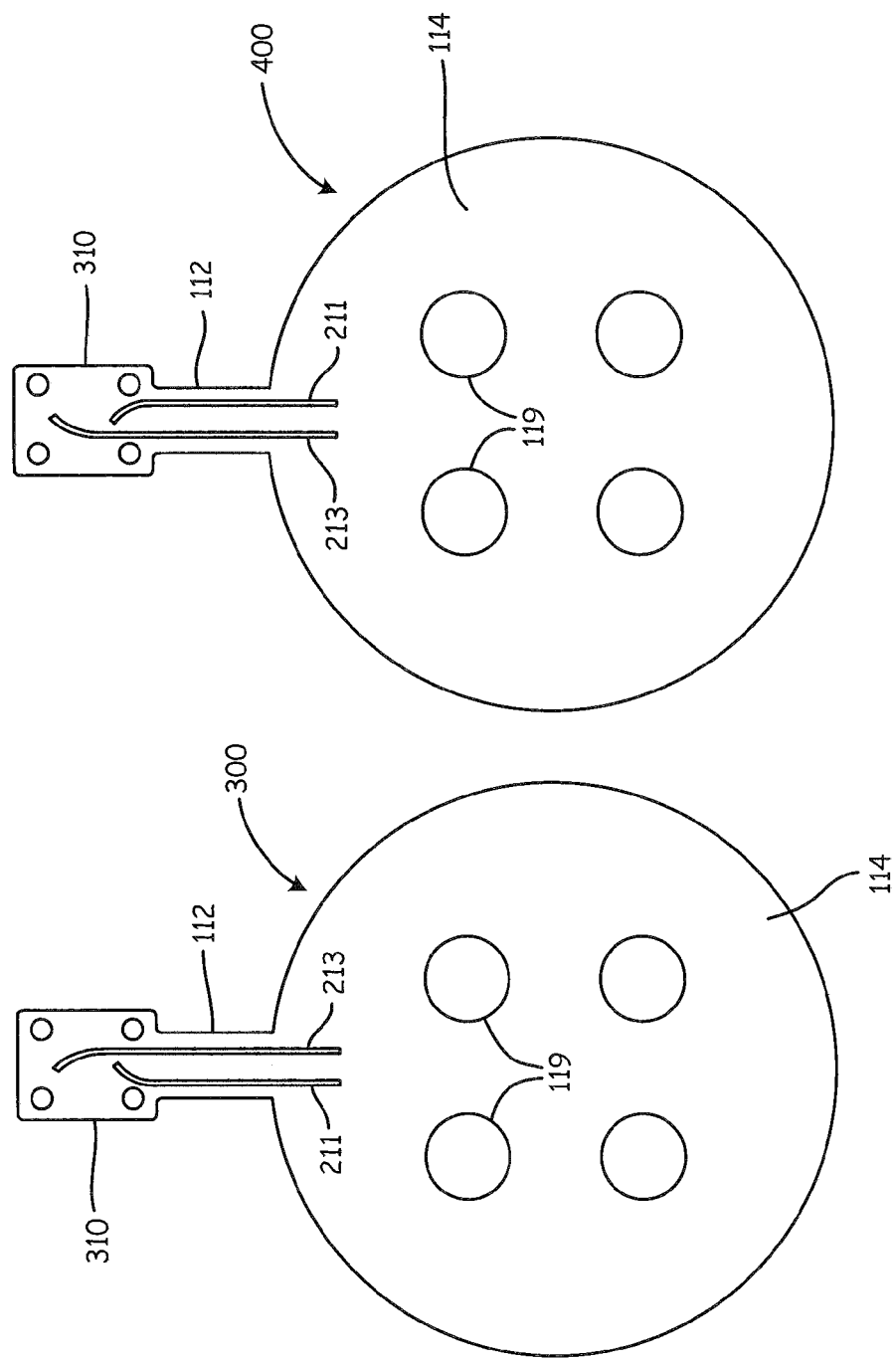
FIG. 4 is an illustration of the paddle style orifice plate section shown in FIG. 3, and a second mirror image paddle style orifice plate section.
Figure 5:
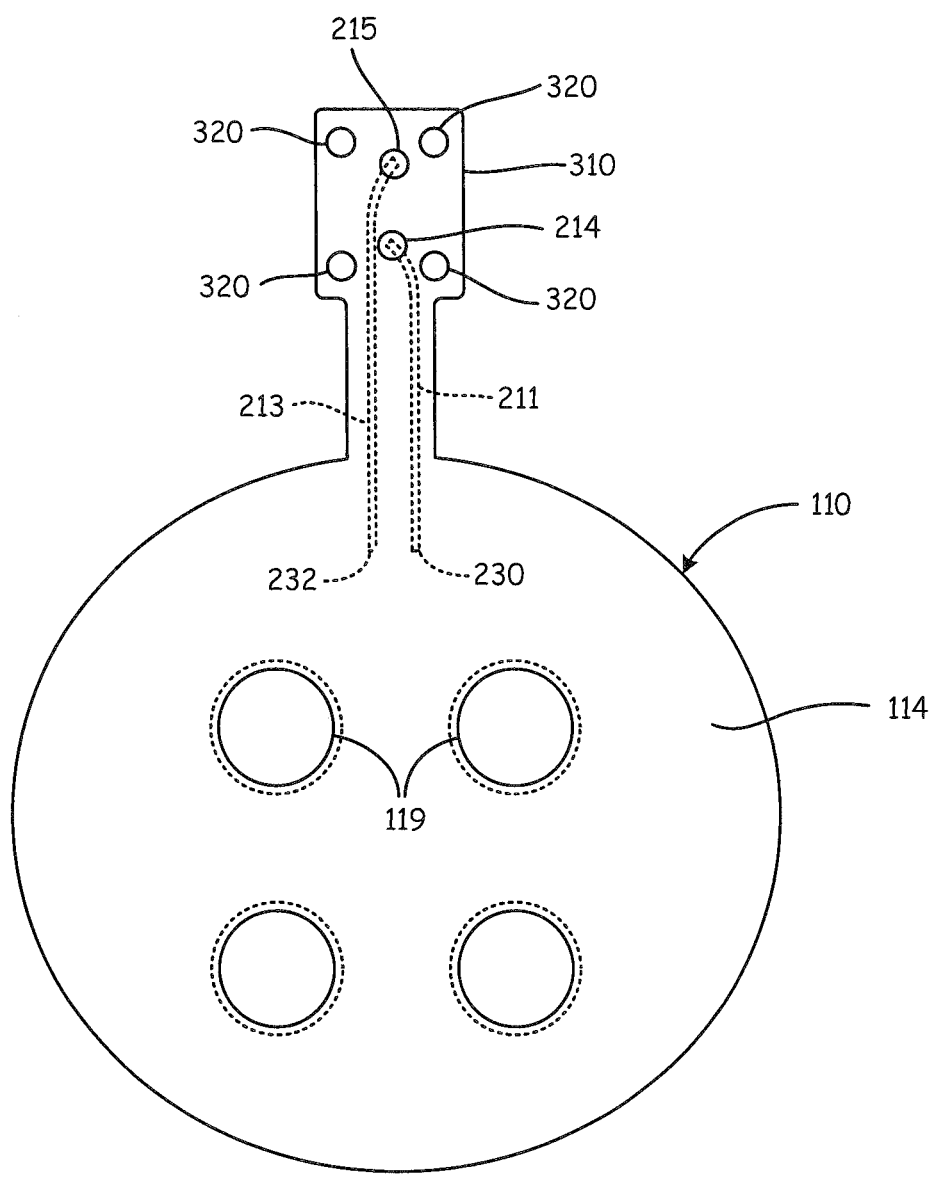
FIG. 5 is a front view illustration of a paddle style orifice plate formed from the paddle style orifice plate sections of FIGS. 3 and 4.

Referring now to FIGS. 3-5, shown first in FIG. 3 is a paddle style orifice plate section 300 which fauns a portion of paddle style orifice plate 110. In exemplary embodiments, orifice plate 110 is formed by sandwiching two thinner plates or plate sections (300 and 400 shown in FIG. 4) together. Each plate section has similar dimensions to a standard paddle style orifice plate, but only half the thickness. Two or more impulse line channels 211 and 213 are machined into the face of each plate leading from desired pressure port locations on the fluid contacting region 114 up the handle 112 as illustrated in FIG. 3. The two plates 300 and 400 are configured to be mirror images of each other. The plates are then stacked together, with the channels 211 and 213 of each plate facing the interior, and are vacuum brazed together to form plate 110 as shown in FIG. 5. Brazing aid products, such as Stop-Off available from Lucas-Milhaupt, can be used to prevent braze paste from plugging the newly foamed channels 211 and 213. After the plates 300 and 400 are joined to form a single flat orifice plate 110, holes are drilled from the face of the plate to the ends of each channel 211 and 213 making the channels into impulse lines. For example, one hole can be drilled from the face of each plate 300 and 400 to a different one of impulse lines 211 and 213 to form upstream and downstream facing pressure ports 230 and 232. These impulse line channels run from the pipe or conduit process to the transmitter connection, e.g., transmitter interface port 214, 215 near the end of the handle 112. The holes for the transmitter interface ports 214, 215 can both be drilled into the handle portion of the same one of plate sections 300 and 400 to allow transmitter 102 to be mounted directly to the handle 112. FIG. 5 shows the plates combined into a single unit 110. The vacuum brazed weld 600 (shown in FIG. 6) between plate sections 300 and 400 allows for a sealed joint that contains pressure, maintains the plate flatness, and creates the internal passages 211, 213 needed for measuring impulse pressure.

Figure 6:
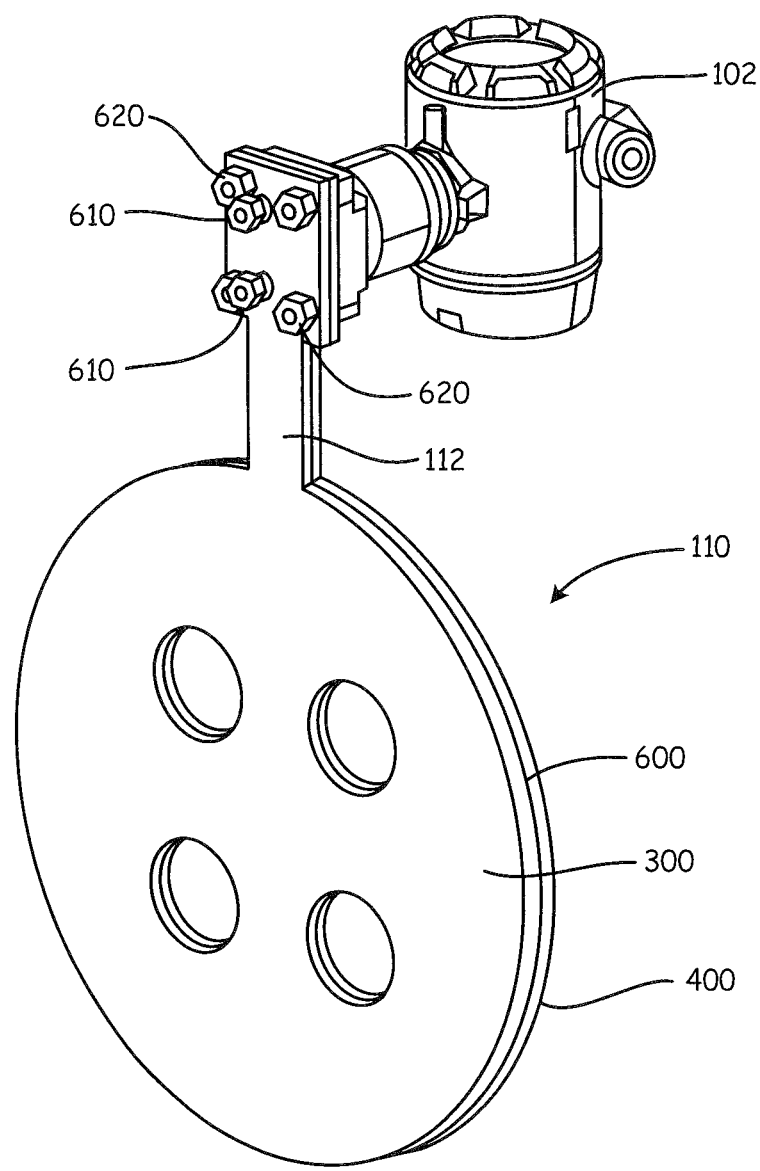
FIG. 6 is a perspective view illustration of process variable monitoring system components including a paddle style orifice plate and a process variable transmitter.

As can be seen in FIGS. 3-5, to provide an integrated flow meter, the outer portion 310 of handle 112 can be widened to fit the footprint of the transmitter 102 (a coplanar module in this embodiment). Apertures 320 for bolting and bosses for vents can be attached allowing the transmitter 102 to be directly attached to the plate 110 as shown in FIG. 6. In FIG. 6, bosses 610 corresponding to transmitter interface ports 214 and 215 are shown, as are fasteners 620 which fasten transmitter 102 to plate 110 though apertures 310. The disclosed design of this embodiment eliminates the need for additional impulse tubing and instrument manifolds, and therefore couples the transmitter directly to the differential pressure primary. The disclosed designs significantly reduce the complexity for installation and the possibilities for leaks and measurement error.

Figure 7:
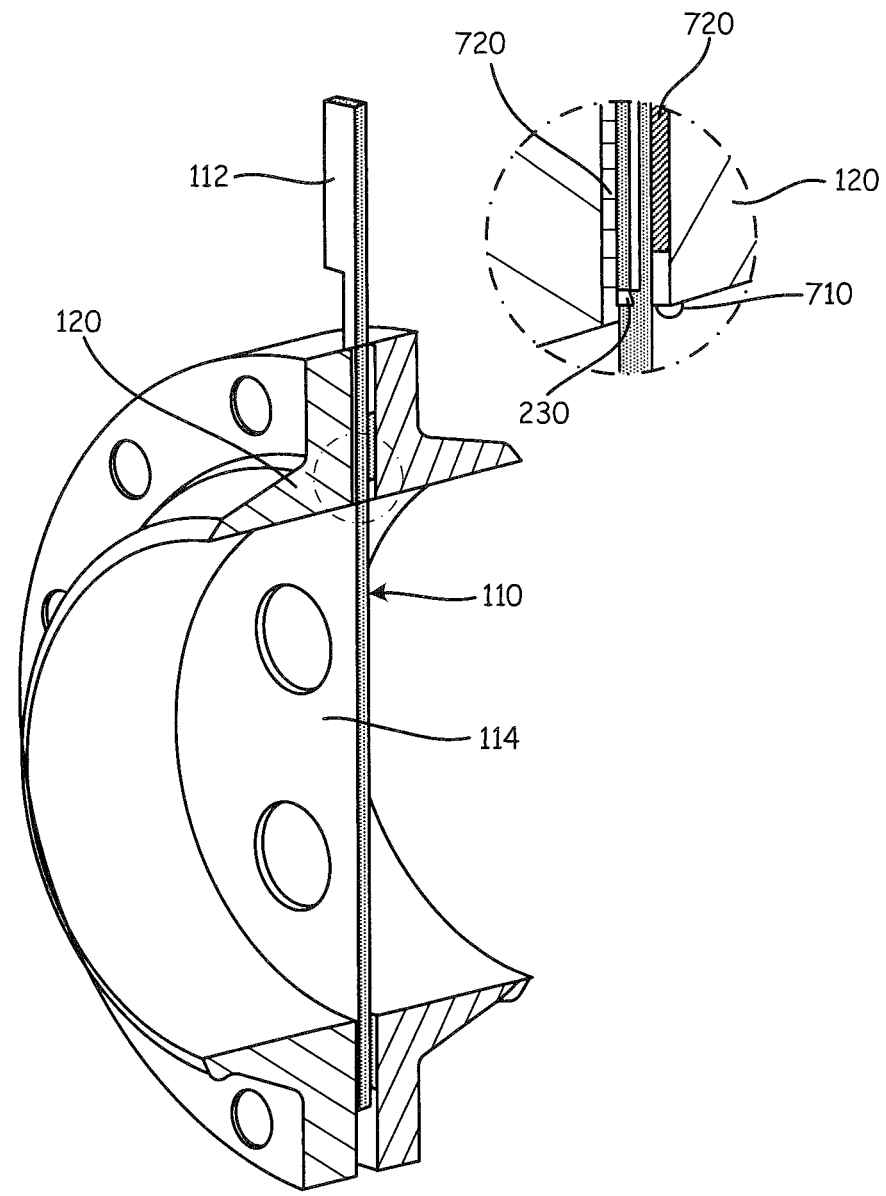
FIG. 7 is a cross sectional perspective view of a portion of the paddle style orifice plate mounted between connecting flanges of conduit sections.

In exemplary embodiments, methods of calculating flow taken using plate 110 can be based on ISO 5167-2. Instead of using the standard flange tap pressure taps frequently associated with paddle style orifice plates, in some exemplary embodiments pressure taps or ports 230, 232 can be corner tap pressure taps. FIG. 7 shows a pressure tap or port (e.g., 230 and/or 232) in some exemplary embodiments positioned on the plate 110 in the annular gap 710 formed by the connection flanges 120 and 122, the gasket 720, and the orifice plate 110. This area moves the port out of the direct flow on the upstream side reducing its potential for clogging and its susceptibility to flow disturbances. The annular gap 710 also allows for an averaging region that reduces noise in the pressure signal.

In some disclosed embodiments, improvement over wafer style integrated flow meters is achieved due to the absence of the wafer. For example, a standard wafer typically has a schedule 40 inside diameter and when it is installed into a different schedule pipe the discharge coefficient (Cd) needs to be adjusted by a factor known as the pipe schedule adjustment factor (PSAF). Since the disclosed embodiments utilize an orifice plate there is no wafer diameter effects to adjust for, leaving the customers and users with only plate bore and pipe inner diameter (ID) geometries to calculate flow. Since no PSAF is necessary and material is minimal, larger line sizes can be easily designed and fabricated. Using the disclosed embodiments, multiple components common to current integrated wafer flow meters, that require extensive manufacturing steps involving machining and welding, may be eliminated. In some disclosed embodiments, the number of components can be significantly reduced along with the number of manufacturing steps. Fewer processes for manufacturing can be refined and controlled. The consistency of production may also be increased. The use of less material as compared to a wafer style flow meter can provide benefits in reduced cost of certain components in exotic materials, allowing special alloys and materials to be used. Plate raw material can be easily sourced in exotic materials and the brazing process can be adapted for exotic materials.

For distribution, for example, the plate 110 can be stocked blank and then be machined to have any of the permutations of orifice bores required by customers before shipping, without compromising delivery dates. Additionally, the number of components customers will need to install to utilize disclosed paddle style orifice plates is significantly less than with wafer style flow meters. The necessity for special flanges, impulse lines, and manifolds is reduced or eliminated, making a flow meter using plate 110 substantially more plug and play. In conjunction with conditioning orifice technology, any place in a pipe with flanged connections and two diameters of upstream and downstream straight run become available measurement points.

Figure 8:
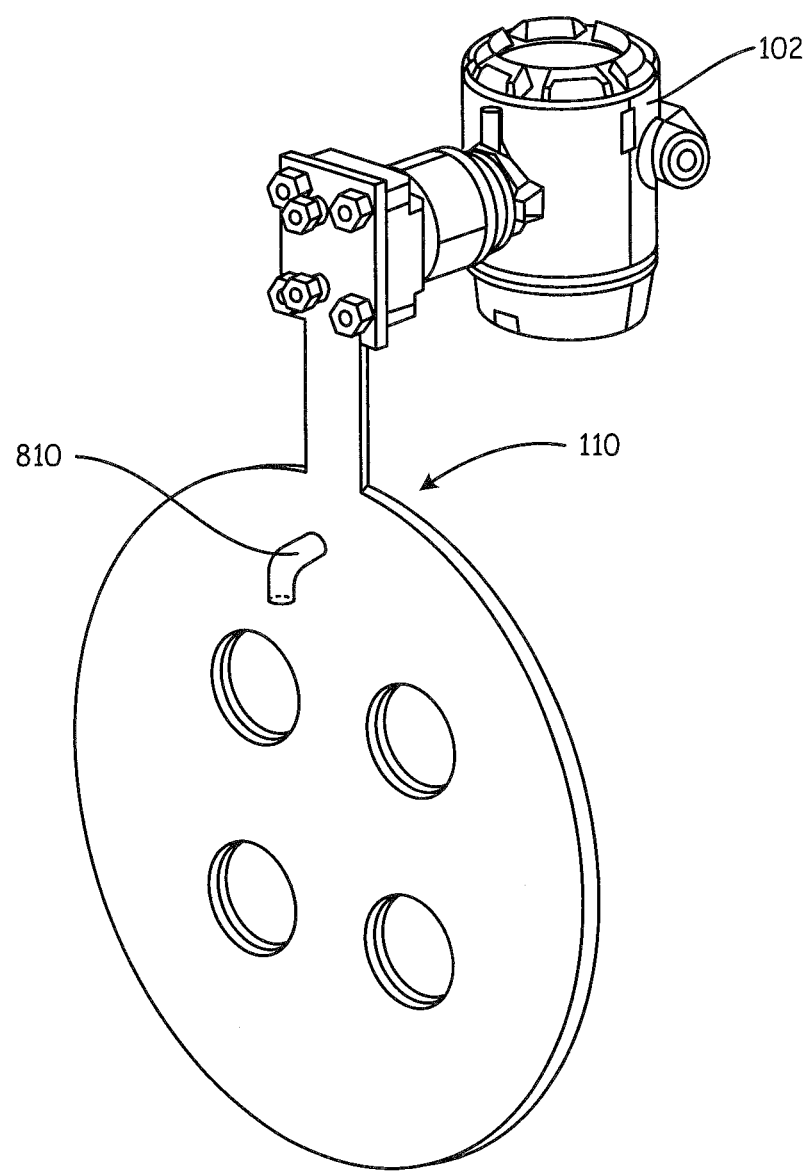
FIGS. 8 and 9 are a perspective view illustration and a side view illustration of process variable monitoring system components including an elbow member on the upstream face of the orifice plate.
Figure 9:
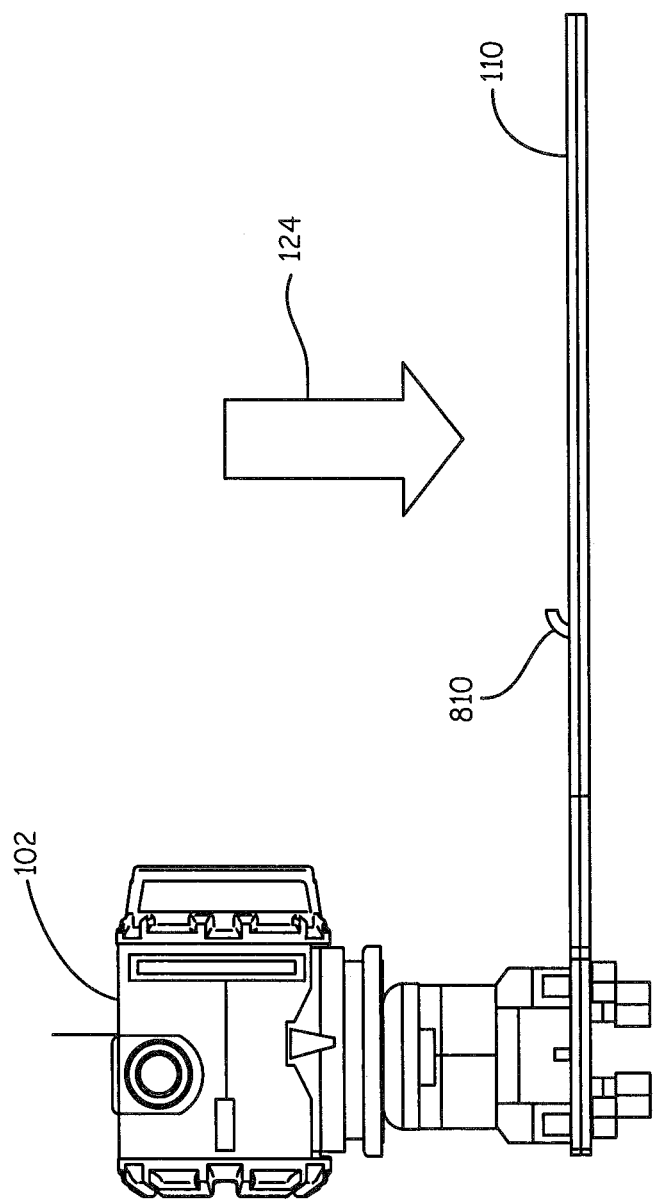

Referring now to FIG. 8, if sensing from the face of the plate is desired and plugging is a concern, an elbow or elbow member 810 can be brazed or tack welded onto the inlet port 230 of the plate 110. As shown in FIG. 9, the elbow 810 turns the outlet of the pressure port 230 from facing directly upstream, reducing potential plugging of the port.

Figure 10:
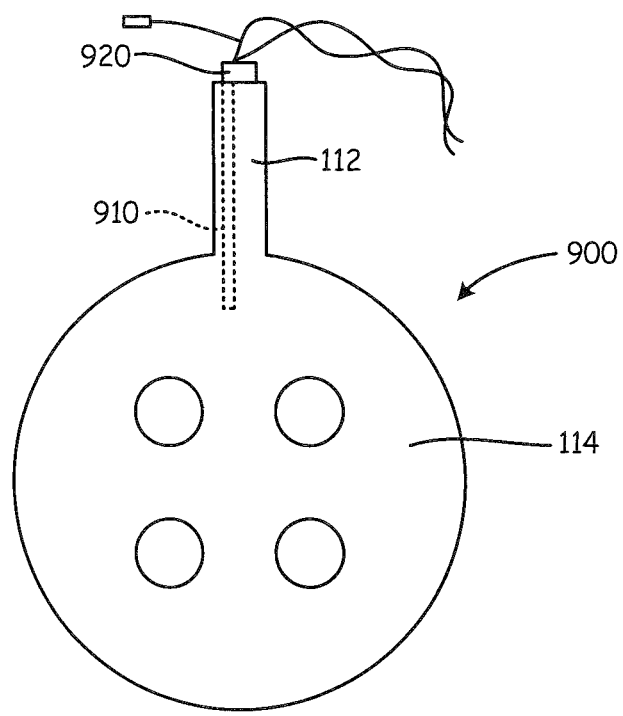
FIGS. 10 and 11 are illustrations of a paddle style orifice plate having a temperature sensor.
Figure 11:
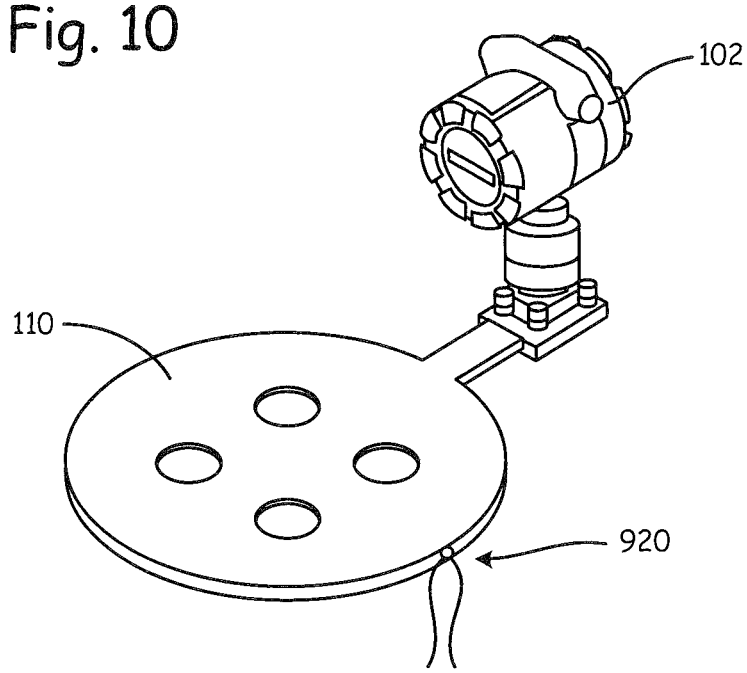

In yet other embodiments, as shown in FIG. 10, a paddle style orifice plate 900, which can include all or some of the features described above with reference to orifice plate 110, includes a secondary sensor path or channel 910 milled or formed in the same or similar manner to that used to create impulse line channels 211 and 213 discussed above. The secondary sensor channel 910 shown in FIG. 10 extends through handle 112 and can be used for a temperature sensor 920 or other secondary types of sensors. For example, channel 910 can route wires for temperature sensor 920 or otherwise couple temperature sensor 920 to the process temperatures. This allows orifice plate flow meters to have temperature compensation without drilling and welding a new pipe tap. In some embodiments, the design can be very similar to the aforementioned paddle orifice plate with integral pressure ports, but only include passageway for the temperature sensor and no transmitter connection. For example, this would be useful for users with existing orifice flanges and impulse tubing where they do not need pressure ports on the plate but the addition of a temperature sensor could be beneficial. In the alternative, as shown in FIG. 11, a temperature sensor can also be added to the paddle orifice plate 110 with integral pressure ports by accessing the side of the plate instead of the head or handle.

Although the present invention has been described with reference to preferred embodiments, workers skilled in the art will recognize that changes may be made in form and detail without departing from the spirit and scope of the invention. Although a conditioning orifice plate is illustrated, the configuration set forth herein may be implemented with any appropriate orifice plate configuration including any number or configuration of apertures.

What is claimed is:

1. A differential pressure fluid flow meter element for insertion between the connecting flanges of conduit sections of a fluid carrying conduit, comprising:
   a flat orifice plate configured to mount between the connecting flanges of the conduit sections having a fluid contacting region for positioning in a flow of fluid through the conduit, and a handle extending outward from an outer portion of the fluid contacting region;
   at least one pressure port formed in the fluid contacting region of the flat orifice plate;
   at least one transmitter interface port formed on the handle of the flat orifice plate and configured to be fluidically coupled to a process variable transmitter when the process variable transmitter is mounted on the handle;
   at least one impulse line channel formed in the flat orifice plate and extending from one of the at least one pressure port through the handle to a corresponding one of the at least one transmitter interface port;
   a plurality of apertures formed in the handle and disposed and arranged relative to the at least one transmitter interface port to mount the process variable transmitter substantially perpendicular to a plane of the handle.

2. The differential pressure fluid flow meter element of claim 1, wherein the flat orifice plate comprises a first flat orifice plate section having the fluid contacting region and the handle extending outward from the outer portion of the fluid contacting region, and comprising a second flat orifice plate section having the fluid contacting region and the handle extending outward from the outer portion of the fluid contacting region, the first and second flat orifice plate sections being stacked and coupled together to form the flat orifice plate.

3. The differential pressure fluid flow meter element of claim 2, and further comprising a vacuum braze connection coupling the first and second flat orifice plate sections.

4. The differential pressure fluid flow meter element of claim 2, wherein the at least one impulse line channel is formed in the first flat orifice plate section.

5. The differential pressure fluid flow meter element of claim 4, wherein the at least one impulse line channel is formed in each of the first and second flat orifice plate sections.

6. The differential pressure fluid flow meter element of claim 1, wherein the at least one pressure port formed in the fluid contacting region of the flat orifice plate comprises a first pressure port formed in an upstream facing surface of the fluid contacting region and a second pressure port formed in a downstream facing surface of the fluid contacting region.

7. The differential pressure fluid flow meter element of claim 6, wherein the at least one impulse line channel comprises a first channel extending from the first pressure port to a first transmitter interface port and a second channel extending from the second pressure port to a second transmitter interface port.

8. The differential pressure fluid flow meter element of claim 7, wherein the first pressure port is formed in a region of the flat orifice plate configured to be positioned in an annular gap between the connecting flanges of the conduit sections and the flat orifice plate.

9. The differential pressure fluid flow meter element of claim 7, and further comprising an elbow member on the upstream facing surface covering and fluidically coupled to the first pressure port to turn an outlet of the first pressure port from facing directly upstream.

10. The differential pressure fluid flow meter element of claim 1, and further comprising a secondary sensor channel formed in the flat orifice plate and extending through the handle.

11. The differential pressure fluid flow meter element of claim 1, and further comprising a temperature sensor having wires routed through the secondary sensor channel.

12. A process variable monitoring system for measuring a process variable indicative of a flow rate of a process fluid in a process pipe, the system comprising:
   a process variable transmitter;
   a flat orifice plate for insertion between connecting flanges of conduit sections of a fluid carrying conduit, the flat orifice plate having a fluid contacting region and a handle extending outward from an outer portion of the fluid contacting region, the handle having a plurality of transmitter mounting apertures extending therethrough and disposed and arranged to mount the process variable transmitter substantially perpendicular to a plane of the handle;
   at least one pressure port formed in the fluid contacting region of the flat orifice plate;
   at least one transmitter interface port formed on the handle of the flat orifice plate and configured to be fluidically coupled to the process variable transmitter when the process variable transmitter is mounted on the handle; and
   at least one impulse line channel formed in the flat orifice plate and extending from one of the at least one pressure port through the handle to a corresponding one of the at least one transmitter interface port.

13. The process variable monitoring system of claim 12, wherein the flat orifice plate comprises a first flat orifice plate section having the fluid contacting region and the handle extending outward from the outer portion of the fluid contacting region, and comprising a second flat orifice plate section having the fluid contacting region and the handle extending outward from the outer portion of the fluid contacting region, the first and second flat orifice plate sections being stacked and coupled together to form the flat orifice plate.

14. The process variable monitoring system of claim 13, wherein the at least one impulse line channel is formed in the first flat orifice plate section.

15. The process variable monitoring system of claim 14, wherein the at least one impulse line channel is formed in each of the first and second flat orifice plate sections.

16. The process variable monitoring system of claim 15, wherein the at least one pressure port formed in the fluid contacting region of the flat orifice plate comprises a first pressure port formed in an upstream facing surface of the fluid contacting region and a second pressure port formed in a downstream facing surface of the fluid contacting region.

17. The process variable monitoring system of claim 16, wherein the at least one impulse line channel comprises a first channel extending from the first pressure port to a first transmitter interface port and a second channel extending from the second pressure port to a second transmitter interface port.

18. The process variable monitoring system of claim 17, wherein the first pressure port is formed in a region of the flat orifice plate configured to be positioned in an annular gap between the connecting flanges of the conduit sections and the flat orifice plate.

19. The process variable monitoring system of claim 17, and further comprising an elbow member on the upstream facing surface covering and fluidically coupled to the first pressure port to turn an outlet of the first pressure port from facing directly upstream.

20. The process variable monitoring system of claim 12, and further comprising a temperature sensor, and comprising a temperature sensor channel formed in the flat orifice plate and extending through the handle, wherein wires of the temperature sensor are routed through the temperature sensor channel.

21. A differential pressure fluid flow meter element for insertion between the connecting flanges of conduit sections of a fluid carrying conduit, comprising:
  a flat orifice plate having a fluid contacting region configured to mount between the connecting flanges of the conduit sections for positioning in a flow of fluid through the conduit, and a handle extending outward from an outer portion of the fluid contacting region;
  at least one pressure port formed in the fluid contacting region of the flat orifice plate;
  at least one interface port formed on the handle of the flat orifice plate;
  at least one impulse line channel formed in the flat orifice plate and extending from one of the at least one pressure port through the handle to a corresponding one of the at least one interface port.

* * * * *